(12) United States Patent
Li et al.

(10) Patent No.: US 9,261,174 B2
(45) Date of Patent: Feb. 16, 2016

(54) POSITIONING DEVICE AND POSITIONING MECHANISM FOR SAME

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Bing Li, Shenzhen (CN); Bo Yang, Shenzhen (CN); Hong-Qi Wang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 228 days.

(21) Appl. No.: 13/854,160

(22) Filed: Apr. 1, 2013

(65) Prior Publication Data

US 2014/0060220 A1    Mar. 6, 2014

(30) Foreign Application Priority Data

Aug. 30, 2012    (CN) .......................... 2012 1 0314564

(51) Int. Cl.
*B23Q 3/02*     (2006.01)
*B25B 5/06*     (2006.01)
*F16H 19/04*    (2006.01)
(Continued)

(52) U.S. Cl.
CPC ................ *F16H 19/04* (2013.01); *B25B 5/003* (2013.01); *B25B 5/006* (2013.01); *B25B 5/064* (2013.01); *B25B 11/02* (2013.01); *Y10T 74/18096* (2015.01)

(58) Field of Classification Search
CPC .......... B25B 5/061; B25B 5/087; B25B 5/16; B25B 5/003; B25B 5/062; B25B 5/122; F15B 15/063
USPC ........... 269/202, 211, 227, 24, 25, 32, 35, 37, 269/51, 91; 74/109, 30
See application file for complete search history.

(56) References Cited

U.S. PATENT DOCUMENTS 1,948,799 A * 2/1934 Oyster ............................ 269/32
2,734,408 A * 2/1956 Smith ............................. 269/29
(Continued)

FOREIGN PATENT DOCUMENTS

CN    2075572 U    4/1991
TW    M312381 U    5/2007

*Primary Examiner* — Lee D Wilson
*Assistant Examiner* — Jamal Daniel
(74) *Attorney, Agent, or Firm* — Novak Druce Connolly Bove + Quigg LLP

(57) ABSTRACT

A positioning device includes a base and two positioning mechanisms oppositely positioned on the base to position a workpiece. Each positioning mechanism includes a driver positioned on the base, a mounting member mounted on the base, a gear rack, a gear, and a positioning member. The mounting member defines a sliding groove. The gear rack slidably is received in the sliding groove and connected with the driver. The gear is rotatably connected with the mounting member and is meshed with the gear rack. The positioning member is fixedly-connected with the gear. The driver drives the gear rack to slide along the sliding groove to make the positioning member rotate and outstretch into an interior of the workpiece. The drivers drive two positioning members apply two opposite forces on the workpiece to positioning the workpiece.

16 Claims, 3 Drawing Sheets

(51) Int. Cl.
*B25B 5/00* (2006.01)
*B25B 11/02* (2006.01)

(56) References Cited

U.S. PATENT DOCUMENTS

| | | | |
|---|---|---|---|
| 2,961,900 A * | 11/1960 | Stanton et al. | 269/91 |
| 3,226,104 A * | 12/1965 | Preisser | 269/227 |
| 3,286,744 A * | 11/1966 | Stall et al. | 83/409 |
| 3,572,216 A * | 3/1971 | Seesody | 92/33 |
| 3,948,502 A * | 4/1976 | Waller et al. | 269/27 |
| 4,986,771 A * | 1/1991 | Braswell | B25B 5/06 439/790 |
| 5,013,015 A * | 5/1991 | Fatheree | 269/24 |
| 5,167,405 A * | 12/1992 | Cayley, Jr. | 269/309 |
| 6,059,277 A * | 5/2000 | Sawdon et al. | 269/24 |
| 6,908,077 B2 * | 6/2005 | Sawdon | 269/32 |
| 8,061,700 B2 * | 11/2011 | Zhang | 269/97 |
| 8,328,171 B2 * | 12/2012 | Aaron | 269/32 |
| 2012/0260748 A1 * | 10/2012 | Shenoi et al. | 73/864 |

* cited by examiner

POSITIONING DEVICE AND POSITIONING MECHANISM FOR SAME

BACKGROUND

1. Technical Field

The present disclosure generally relates to a positioning device and a positioning mechanism used in the positioning device for the positioning of a workpiece.

2. Description of the Related Art

Positioning devices need to be positioned in an interior of workpieces to avoid damaging outer surfaces of the workpiece, which have been machined first. The positioning device usually includes two opposite positioning mechanisms. Each positioning mechanism includes a first driver, a second driver, and a positioning member driven by the first and second drivers. Because two drivers drive the positioning members to reach the interior of the workpiece to position the workpiece, operating efficiency is relatively low. In addition, two drivers require to occupy significant amount of space.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
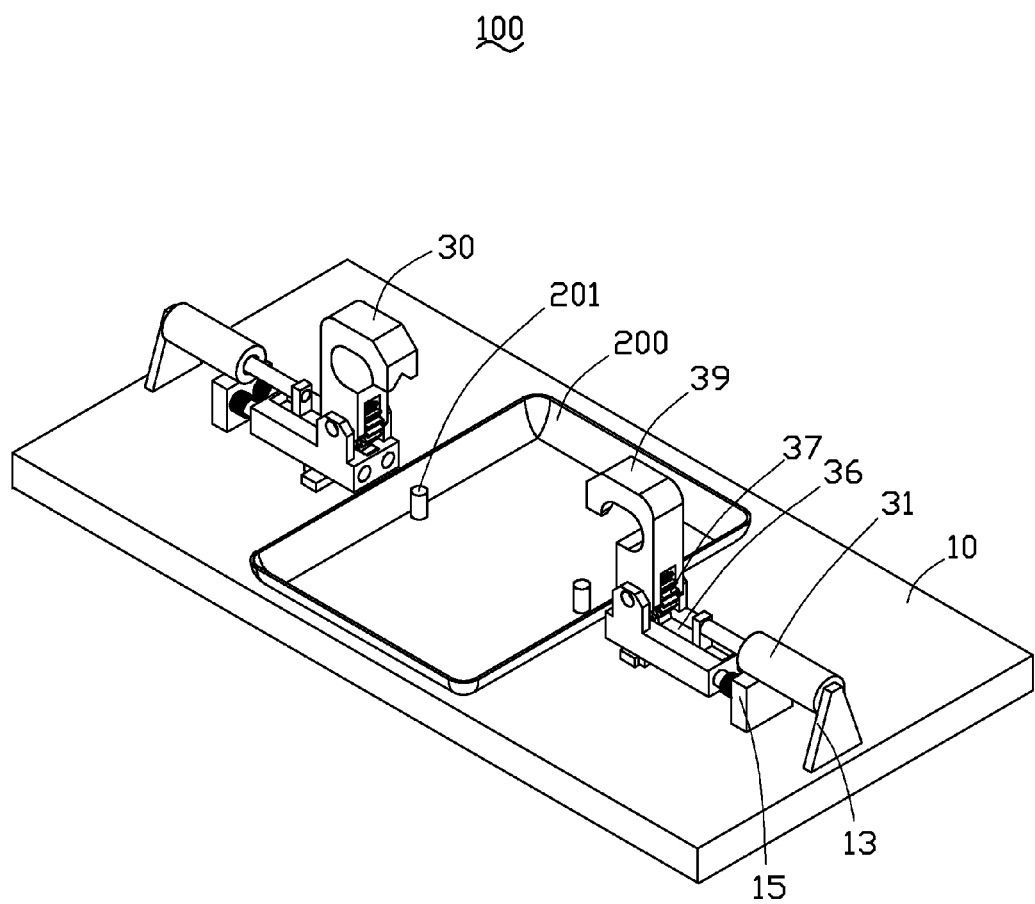
FIG. 1 shows an assembled, isometric view of a positioning device in an exemplary embodiment.

FIG. 1 is a positioning device 100 of an exemplary embodiment. The positioning device is used for positioning a workpiece 200. The positioning device 100 includes a base 10, and two positioning mechanisms 30 oppositely-positioned on the base 10. The workpiece 200 is positioned on the base 10 between the two positioning mechanisms 30. The workpiece 200 is substantially a rectangular case. Two positioning posts 201 protrude from a bottom wall of the workpiece 200 adjacent to opposite sidewalls of the workpiece 200, respectively.

Figure 2:
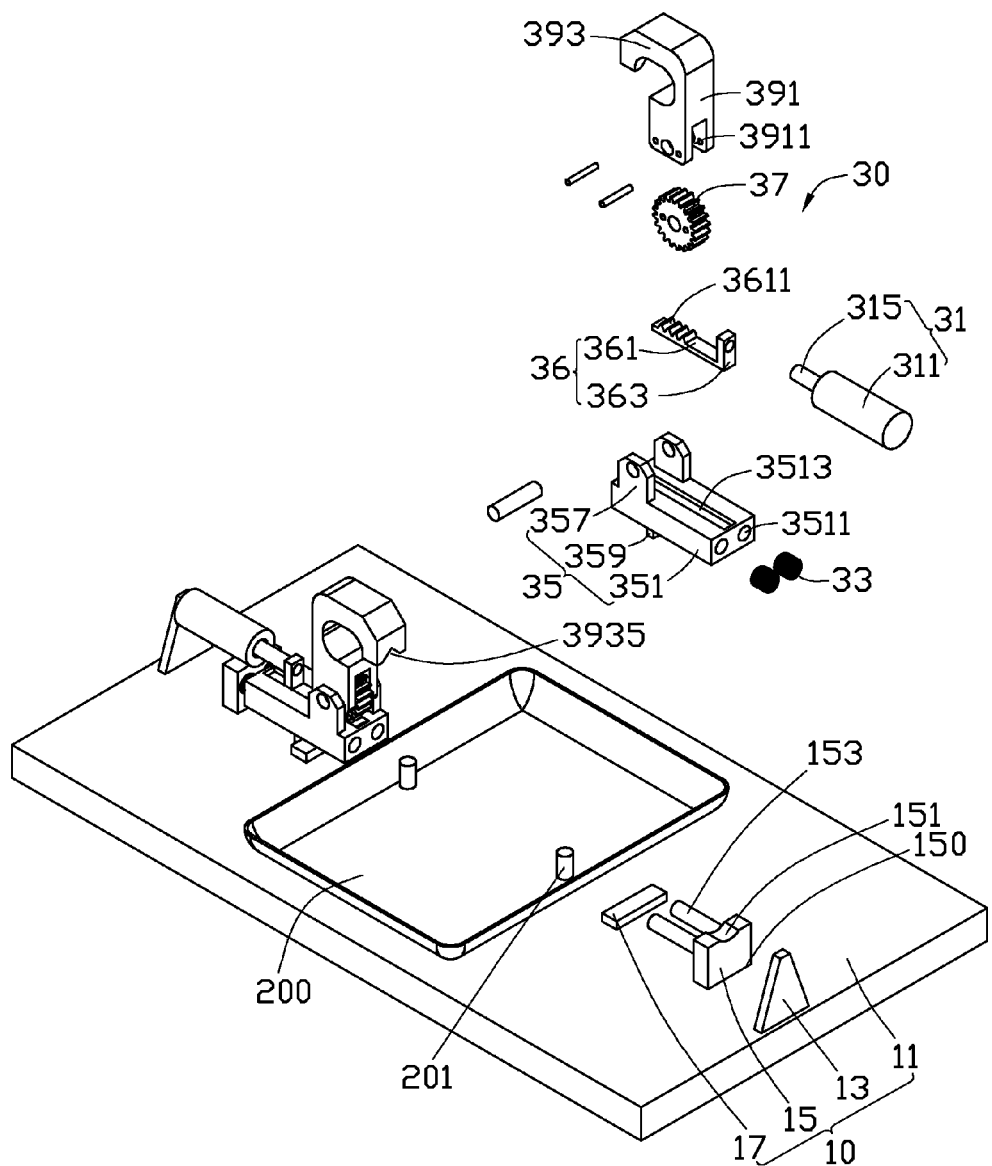
FIG. 2 is a partial, exploded, and isometric view of the positioning device of FIG. 1.

FIG. 2 shows that the base 10 is substantially a rectangular board. The base 10 includes a support board 11, two fixing members 13, two loading members 15, and two limiting members 17. The two fixing members 13, the two loading members 15, and the two limiting members 17 are fixedly mounted on the support board 11. The two fixing members 13 are substantially perpendicularly-mounted on opposite ends of the support board 11. Each loading member 15 is positioned on the support board 11 between one limiting member 17 and one corresponding fixing member 13. Each loading member 15 includes a main body 150 and two guiding posts 153 protruding substantially parallel from a side surface of the main body 150 away from the corresponding fixing member 13. The main body 150 is fixed on the support board 11. A loading groove 151 is recessed on a top surface of the main body 150 away from the support board 11. The guiding posts 153 are parallel to the support board 11. Each limiting member 17 is positioned on the support board 11 adjacent to a free end of the guiding posts 153. The fixing members 13, the loading members 15, and the limiting members 17 are substantially positioned in line on the support board 11. The workpiece 200 is positioned between the two limiting members 17.

Each positioning mechanism 30 includes a driver 31, two elastic members 33, a mounting member 35, a gear rack 36, a gear 37, and a positioning member 39. The driver 31 is positioned on one fixing member 13 and one corresponding loading member 15. The mounting members 35 are slidably sleeved on the guiding posts 153. Each elastic member 33 sleeves on one guiding post 153 between the main body 150 and the mounting member 35. The gear rack 36 is slidably positioned in the mounting member 35, and is non-rotatably connected to the driver 31. The gear 37 is rotatably connected to the mounting member 35, and is meshed with the gear rack 36. The positioning member 39 is fixedly-connected to the gear 37 above the mounting member 35. The driver 31 is used for driving the gear rack 36 to move on the mounting member 35. The positioning members 39 of the two positioning mechanisms 30 are driven to position or release the workpiece 200 by means of the rotations of the gears 37. In other embodiments, the number of the elastic members 33 can be changed as needed, such as one, three or more, and the number of the guiding posts 153 corresponds to the number of the elastic members 33.

The driver 31 includes a base body 311 and an extension rod 315 movably connected to the base body 311. One end of the base body 311 is fixedly-connected to the fixing member 13 away from the extension rod 315. The other end of the base body 311 is positioned in the loading groove 151. In the illustrated embodiment, the drivers 31 are cylinders.

The mounting member 35 includes a mounting body 351, two ears 357, and a stop block 359. The mounting body 351 is substantially a rectangular board. Two substantially cylindrical guiding holes 3511 are defined in the mounting body 351. Each guiding post 153 passes through one corresponding guiding hole 3511. A substantially strip-shaped sliding groove 3513 is defined in a top surface of the mounting body 351 away from the support board 11. The two ears 357 substantially vertically protrude from one end of the main body 351 away from the loading member 15. The sliding groove 3513 is positioned between the two ears 357. The stop block 359 protrudes from a middle area of a bottom surface of the mounting body 351 facing the support board 11.

The substantially L-shaped gear rack 36 includes a teeth portion 361 and a connecting portion 363 perpendicularly extending from one end of the teeth portion 361. The teeth portion 361 is slidably-received in the sliding groove 3513. A plurality of teeth 3611 is formed on the other end of the teeth portion 361. The connecting portion 363 protrudes from the sliding groove 3513, and connects with the extension rod 315.

The gear 37 is rotatably-connected to the two ears 357 at between the two ears 357, and is meshed with the teeth 3611. The positioning member 39 includes a rotation portion 391 and a positioning portion 393 extending in a curved fashion or configuration from one end of the rotation portion 391. A receiving groove 3911 is defined in one end of the rotation portion 391 away from the positioning portion 393. The gear 37 is received in the receiving groove 3911, and is non-rotatably connected to two sidewalls of the receiving groove 3911, while being rotatably connecting with the ears 357 via another rotation shaft (not labeled). The positioning portion 393 is substantially a C-shaped structure. A substantially V-shaped positioning groove 3935 is defined in an end surface of the positioning portion 393 away from the rotation portion 391.

In assembly, the driver 31 is fixed on the base 10. The two elastic members 33 sleeve on the two guiding posts 153. The two guiding posts 153 are inserted into the two guiding holes 3511. The gear rack 36 is inserted into the sliding groove 3513, and the connecting portion 363 is fixedly-connected with the extension rod 315. Next, the gear 37 is rotatably-positioned in the receiving groove 3911. The gear 37 being assembled with the rotation portion 391 is rotatably-connected to the ears 357. Thus, one positioning mechanism 30 is assembled with the base 10. The other positioning mechanism 30 is oppositely positioned on the base 10 by using a similar assembly process.

Figure 3:
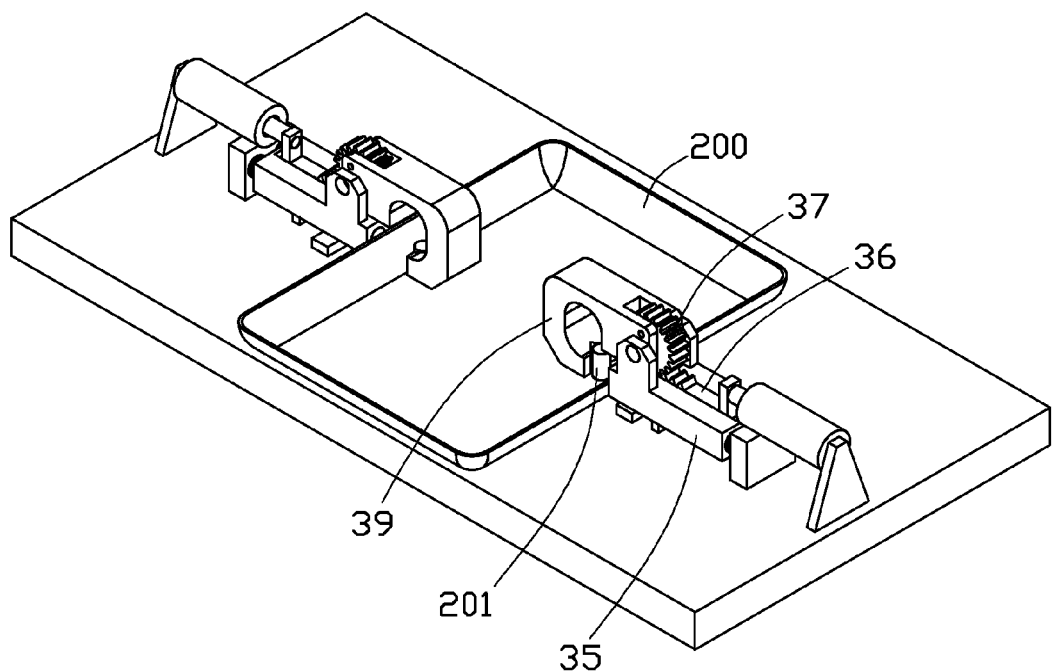
FIG. 3 shows a working or operating state of the positioning device of FIG. 1.

In the illustrated embodiment, the rotation portion 391 is substantially perpendicular to the mounting member 35 when operating in a releasing state of the positioning device 100 (as shown in FIG. 1), and the stop block 359 resists against the limiting member 17. Referring to FIG. 3, the workpiece 200 is positioned on the base 10 between the two positioning mechanisms 30. To position the positioning device 100, the extension rod 315 moves towards the base body 311, and the gear rack 36 is driven to slide towards the fixing member 13 along the sliding groove 3513 by the extension rod 315 of the driver 31. The positioning member 39 is driven to rotate towards the workpiece 200 by using the rotation of the gear 37. The positioning member 39 is substantially configured in a plane with the mounting member 35 when an end of the teeth portion 361 adjacent to the connecting portion 363 resists against an end wall of the sliding groove 3513, and the positioning portion 393 outstretches and reaches into the interior of the workpiece 200. The extension rod 315 continues to move towards the base body 311. The mounting member 35 is driven to move towards the loading member 15, and the elastic members 33 are then compressed. Finally, the positioning post 201 reaches the positioning groove 3935 and resists against a sidewall of the positioning groove 3935. Because of having the two positioning portions 393 applying forces in opposite directions, the positioning device 100 thus positions the workpiece 200 in a stably manner. In other embodiments, the degree of rotation of the positioning member 39 is not limited to 90 degrees.

When the workpiece 200 needs to be released from the clamping and grasping of the positioning members 39, the extension rod 315 moves towards the positioning member 39. The mounting member 35 moves towards the workpiece 200 by using the restoring force of the elastic members 33, and returns to its original position. The stop block 359 resists against the limiting member 17. The positioning member 39 releases the positioning post 201. The extension rod 315 continues to move towards the positioning member 39. The gear rack 36 slides along the sliding groove 3513 and pushes the positioning member 39 to rotate. The positioning member 39 returns to its original position.

The gear 37 of each positioning mechanism 30 is meshed with the teeth 3611 of the gear rack 36. The positioning member 39 positions the workpiece 200 by having only one driver 31 configured for each positioning mechanism 30. The positioning process of the workpiece 200 by using the positioning device 100 can be finished or completed in just one time or procedure, such that positioning efficiency of the positioning process is improved. In addition, because of using just one driver 31 in each positioning mechanism 30, spaces will be saved.

In other embodiments, the fixing member 13 and the loading member 15 can be omitted, then the driver 31 and the mounting member 35 are directly positioned on the support board 11.

In some embodiments, the positioning groove 3935 can be omitted, and an end surface of the positioning portion 393 away from the rotation portion 391 abuts directly against the guiding post 201.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A positioning device for positioning a workpiece, comprising:
    a base; and
    two positioning mechanisms oppositely positioned on the base, each of the two positioning mechanisms comprising:
        a driver positioned on the base;
        a mounting member movably mounted on the base adjacent to the driver, the mounting member defining a sliding groove with an end wall thereof being adjacent to the driver;
        a gear rack slidably received in the sliding groove, and connected to the driver;
        a gear rotatably connected to the mounting member, and meshed with the gear rack; and
        a positioning member non-rotatably connected to the gear, wherein the driver drives the gear rack to slide along the sliding groove to make the positioning member rotate and outstretch into an interior of the workpiece, when the gear rack resists against the end wall of the sliding groove, the driver drives the mounting member to move together with the positioning member, such that two positioning members of the two positioning mechanisms apply opposite forces on the workpiece to positioning the workpiece.

2. The positioning device of claim 1, wherein the gear rack comprises a teeth portion and a connecting portion extending from one end of the teeth portion, the teeth portion is slidably received in the sliding groove, a plurality of teeth is formed on the other end of the teeth portion away from the connecting portion, the plurality of teeth is meshed with the gear, and the connecting portion is connected to the driver.

3. The positioning device of claim 1, wherein the mounting member comprises a mounting body and two ears protruding from one end of the mounting body away from the driver, the sliding groove is defined in the mounting body between the two ears, and the gear is rotatably connected to the two ears.

4. The positioning device of claim 1, wherein the base comprises a support board, two fixing members oppositely mounted on the support board and two loading members, each loading member is positioned on the support board adjacent to one fixing member, and each driver is mounted between one fixing member and one corresponding loading member.

5. The positioning device of claim 4, wherein the loading member comprises a main body fixed on the support body and a guiding post protruding from a side surface of the main body away from the fixing member, a guiding hole is defined in the mounting member, and the guiding post passes through the guiding hole.

6. The positioning device of claim 5, wherein each positioning mechanism further comprises an elastic member sleeving on the guiding post between the main body and the mounting member.

7. The positioning device of claim 4, wherein the base further comprises two limiting members positioned on the support board, each loading member is positioned between one fixing member and corresponding limiting member, and a stop block is formed on a bottom surface of each mounting member facing the support board to resist against one corresponding limiting member.

8. The positioning device of claim 1, wherein the positioning member comprises a rotation portion non-rotatably connected to the gear and a positioning portion extending in a curved fashion from one end of the rotation portion.

9. The positioning device of claim 8, wherein a positioning groove is defined in an end surface of the positioning portion away from the rotation portion.

10. The positioning device of claim 8, wherein a receiving groove is defined in the rotation portion away from the positioning portion, and the gear is received in the receiving groove and non-rotatably connected with sidewalls of the receiving groove.

11. A positioning mechanism, comprising:
a driver;
a mounting member positioned adjacent to the driver, the mounting member comprising a mounting body and two ears protruding from one end of the mounting body away from the driver, and a top surface of the mounting body defining a sliding groove, the sliding groove positioned between the two ears;
a gear rack slidably received in the sliding groove, and connected to the driver;
a gear rotatably connected with the two ears of the mounting member, and meshed with the gear rack; and
a positioning member non-rotatably connected with the gear, wherein the driver drives the gear rack to slide along the sliding groove to make the positioning member rotate, wherein a receiving groove is defined in an end of the positioning member adjacent to the gear rack, and the gear is received in the receiving groove and non-rotatably connected with opposite sidewalls of the receiving groove.

12. The positioning mechanism of claim 11, wherein the gear rack comprises a teeth portion and a connecting portion extending from one end of the teeth portion, the teeth portion is slidably received in the sliding groove, a plurality of teeth is formed on the other end of the teeth portion away from the connecting portion, and is meshed with the gear, and the connecting portion is connected to the driver.

13. The positioning mechanism of claim 11, wherein the positioning mechanism further comprises a loading member, the loading member comprises a main body and a guiding post protruding from a side surface of the main body away from the fixing member, a guiding hole is defined in the main body, and the guiding post passes through the guiding hole.

14. The positioning mechanism of claim 13, wherein the positioning mechanism further comprises an elastic member sleeving on the guiding post between the main body and the mounting member.

15. The positioning device of claim 11, wherein the positioning member comprises a rotation portion non-rotatably connected to the gear and a positioning portion extending in a curved fashion from one end of the rotation portion, and the receiving groove is defined in an end of the rotation portion away from the positioning portion.

16. The positioning device of claim 15, wherein a positioning groove is defined in an end surface of the positioning portion away from the rotation portion.

* * * * *